United States Patent [19]

Aoki

[11] Patent Number: 5,397,616
[45] Date of Patent: Mar. 14, 1995

[54] UNVULCANIZED TREAD MATERIAL FOR PNEUMATIC TIRE, METHOD OF MANUFACTURING PNEUMATIC TIRE, AND PNEUMATIC TIRE OBTAINED BY METHOD

[75] Inventor: Yasutoshi Aoki, Kodaira, Japan

[73] Assignee: Bridgestone Corporation, Tokyo, Japan

[21] Appl. No.: 955,973

[22] Filed: Oct. 2, 1992

[30] Foreign Application Priority Data

Oct. 8, 1991 [JP] Japan .................. 3-260880

[51] Int. Cl.⁶ .............................. B32B 9/00
[52] U.S. Cl. ...................... 428/33; 428/163; 428/172; 428/212; 428/493; 152/209 R; 152/525
[58] Field of Search .......... 152/209 R, 525, 330, 152/360, 454, 532; 428/163, 172, 212, 33

[56] References Cited

U.S. PATENT DOCUMENTS

| | | |
|---|---|---|
| 1,356,891 | 10/1920 | Steinle . |
| 4,169,877 | 10/1979 | Olsen et al. . |
| 4,698,245 | 10/1987 | Schallmeier et al. .............. 428/32 |
| 4,739,811 | 4/1988 | Rampl ............................ 152/209 R |

FOREIGN PATENT DOCUMENTS

| | | |
|---|---|---|
| 0209125 | 1/1987 | European Pat. Off. . |
| 0341187 | 11/1989 | European Pat. Off. . |
| 2110703 | 6/1972 | France . |
| 1228525 | 3/1958 | Germany . |
| 56-8704 | 1/1981 | Japan . |
| 61-64503 | 4/1986 | Japan . |
| 62-18304 | 1/1987 | Japan . |

*Primary Examiner*—Patrick J. Ryan
*Assistant Examiner*—Abraham Bahta
*Attorney, Agent, or Firm*—Oliff & Berridge

[57] ABSTRACT

An unvulcanized tread material for a pneumatic tire, including two layer members of a cap layer and a base layer and having a structure in which one or more portions of the base layer member project into the cap layer. The one or more portions of the base layer member project into the cap layer so as to respectively oppose one or more circumferential direction grooves to be formed in a manufactured tire. An interior of a mold is pressurized so that one or more convex portions, for forming a tire groove, of the mold and one or more projecting portions of the base layer member respectively contact. A manufactured tire in which the base layer member is exposed at bottoms of one or more grooves is formed.

8 Claims, 7 Drawing Sheets

UNVULCANIZED TREAD MATERIAL FOR PNEUMATIC TIRE, METHOD OF MANUFACTURING PNEUMATIC TIRE, AND PNEUMATIC TIRE OBTAINED BY METHOD

BACKGROUND OF THE INVENTION

1. Field of the Invention

The present invention relates to an unvulcanized tread material for a pneumatic tire used in vehicles such as automobiles, a method of manufacturing a pneumatic tire by using the unvulcanized tread material for a pneumatic tire, and a pneumatic tire obtained by this method.

2. Description of the Related Art

Conventionally, a cap/baseplate structure has been proposed as a means to reconcile reciprocal properties of a pneumatic tire, such as wet resistance and low-rolling resistance.

A cap/baseplate structure for radial tires for, in particular, heavy loads has been proposed in which a combination of a cap rubber, formed of an NR/SBR rubber which may provide irregular wear resistance, and a base rubber, formed of an NR rubber which may provide heat build-up resistance and crack growth resistance, is used.

A conventional unvulcanized tread material having a cap/base structure is illustrated in FIG. 6. An unvulcanized tread material 100 is subject to extrusion molding by an extruder to be formed as an elongated sheet. As shown in the drawing, the unvulcanized tread material 100 is a two-layer structure in which a cap rubber 102 and a base rubber 104 are laminated. A boundary surface 106 between the cap rubber 102 and the base rubber 104 is substantially plane-shaped. Further, a cross section orthogonal to the longitudinal direction of the unvulcanized tread material 100 is a trapezoidal shape in which the tread side (the upper side of FIG. 6) has a narrow width.

FIG. 7 is a partially sectional view of a tire obtained by vulcanizing in a mold the green tire having the tread material 100. As shown in FIG. 7, in a manufactured tire 108, the boundary surface 106 of the cap rubber 102 and the base rubber 104 is curved in at vicinities of bottom portions of circumferential direction grooves 112 of a tread 110. Portions of the cap rubber :102 remain as thin-walls so as to surround bottom portions 112A of the respective circumferential direction grooves 112.

When the manufactured tire 108 is put into actual use, stress is often concentrated on the bottom portions 112A of the circumferential direction grooves 112, especially those on the shoulder portion, due to curbs and the like which the vehicle rides over. In the conventional manufactured tire 108, because the periphery of the bottom portion 112A is formed by the cap rubber 102, cracks form easily in the bottom portion 112A. There is therefore a drawback in that the cracks may spread to the boundary surface 106 and cause rib tear defects.

SUMMARY OF THE INVENTION

An object of the present invention is to provide an unvulcanized tread material for a pneumatic tire in which the occurrence of cracks at bottom portions of tire grooves can be prevented and rib tear defects can be eliminated. A further object of the present invention is to provide a method of manufacturing of a pneumatic tire equipped by using this unvulcanized tread material.

A still further object of the present invention is to provide a pneumatic tire in which the occurrence of cracks at bottom portions of tire grooves can be prevented and rib tear defects can be eliminated The unvulcanized tread material for a pneumatic tire in accordance with the present invention comprises two layer members of a cap layer and a base layer and has a structure in which one or more portions of the base layer member project into the cap layer.

It is preferable that one or more portions of the base layer member project into the cap layer so as to respectively oppose one or more circumferential direction grooves to be formed in a manufactured tire. In particular, it is preferable that one of the one or more circumferential direction grooves is a circumferential direction groove of the shoulder side.

In this way, in the unvulcanized tread material for a pneumatic tire having a structure in which the one or more projecting portions are provided at positions which respectively oppose the groove portions to be formed in the manufactured tire, the thicknesses of the portions of the cap layer which oppose the projecting base layer member are thin compared to the thicknesses of portions of the cap layer where the base layer member does not project. By inserting a green tire equipped width this material into a mold and increasing the internal pressure of the green tire, the projecting portion approaches the convex portion, for forming a groove, of the mold. Simultaneously, the thin cap layer member therebetween moves to both sides of the convex portion for forming a tire groove. Then, the projecting portion of the base layer and the top portion of the convex portion for forming a tire groove contact. As a result, the base portion is exposed at at least one groove bottom portion of the manufactured tire. Because the base layer member has high flexibility compared to the cap layer member, it is difficult for cracks to form in the bottom portions of the grooves of the tire. Accordingly, rib tear defects, which are caused by cracks in the bottom portions of grooves, can be prevented.

In accordance with the above-described present invention, it is preferable that the height of the projection of the base layer member into the cap layer be greater than or equal to 3 mm. The base layer member may project such that it penetrates the cap layer and is exposed on the outer surface of the cap layer.

Further, in accordance with the present invention, it is preferable that the cap layer is formed of NR/SBR rubber and that the base layer be formed of NR rubber. The former contributes irregular wear resistance to the tire, and the latter contributes heat build-up resistance and crack growth resistance to the tire.

A further aspect of the present invention provides a method of manufacturing a pneumatic tire by subjecting a green tire to vulcanization forming within a mold. This method includes a step of forming a green tire by disposing, on an outermost periphery of the green tire, an unvulcanized tread material for a pneumatic tire which comprises two layer members of a cap layer and a base layer, the unvulcanized tread material having a structure in which one or more portions of the base layer member project into the cap layer so as to respectively oppose one or more circumferential direction grooves to be formed in a manufactured tire. Further, the method includes a step of vulcanizing the green tire by forcing one or more convex portions, for forming a circumferential direction groove, of the mold into contact respectively with said one or more portions of the base layer member while heating the green tire.

According to this method, a tire in which the base layer member is exposed at at least one groove bottom portion of the manufactured tire can be obtained. Therefore, the method of the present invention is appropriate for the manufacture of pneumatic tires having few rib tear defects.

In the tread material used in the method of the present invention, it is preferable that the height of the projection of the base layer member into the cap layer is greater than or equal to 3 mm. The base layer member may project so as to penetrate the cap layer and be appear at the outer surface of the cap layer. It is preferable that the cap layer be formed of NR/SBR rubber and that the base layer be formed of NR rubber.

Further, the present invention also includes a pneumatic tire manufactured by the method of the present invention.

DETAILED DESCRIPTION OF THE PREFERRED EMBODIMENTS

An embodiment of the present invention will be described in accordance with FIGS. 1 through 3.

Figure 3:
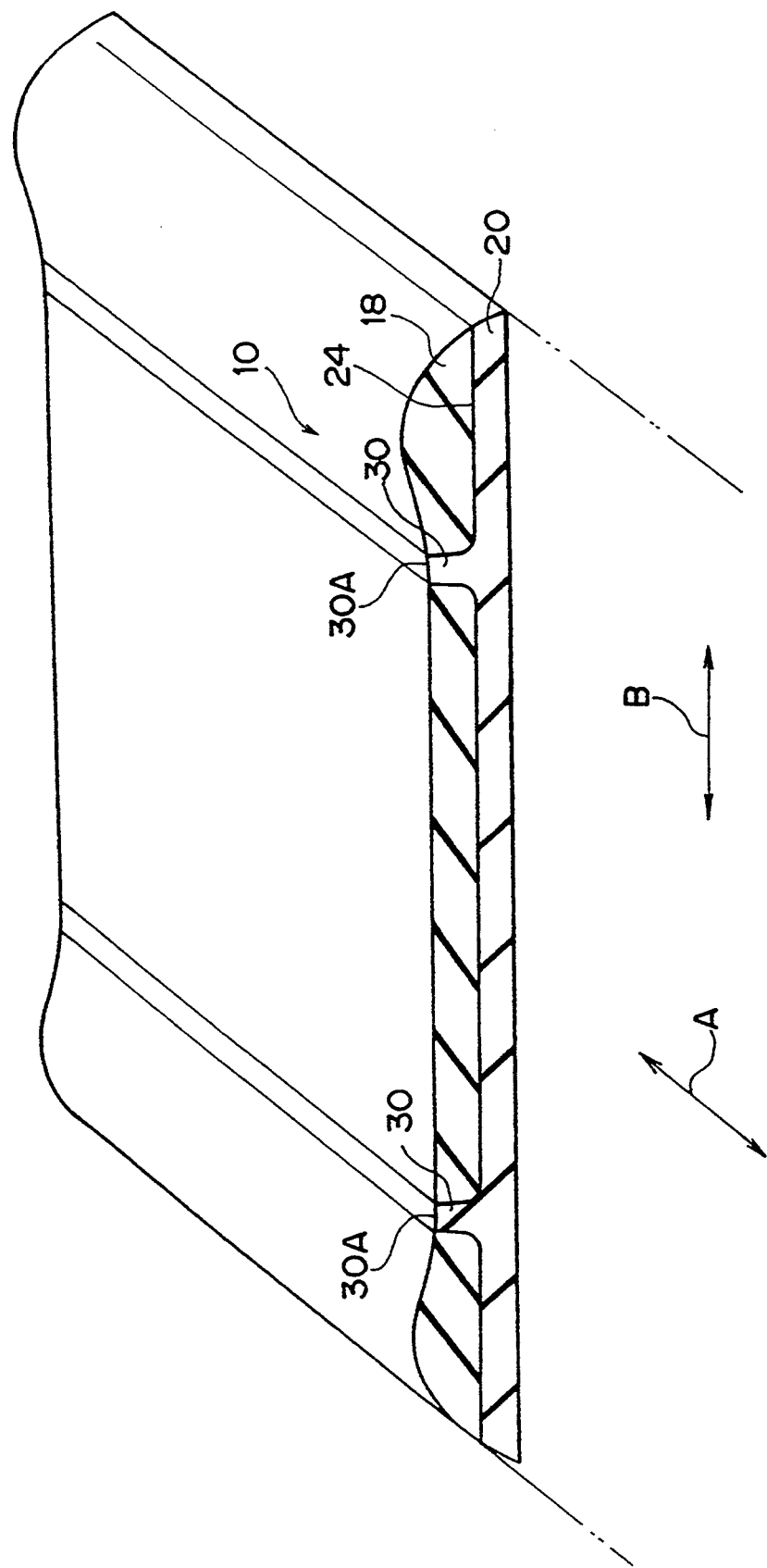
FIG. 3 is a perspective sectional view of the embodiment of an unvulcanized tread material of the present invention.

The embodiment of an unvulcanized tread material according to the present invention is illustrated in FIG. 3. An unvulcanized tread material 10 has a two-layer structure of a cap rubber 18 and a base rubber 20, and is generally formed as an elongated sheet. A cross section orthogonal to the longitudinal direction of the unvulcanized tread material 10 (the direction of arrow A in FIG. 3) is a substantially trapezoid shape in which the cap rubber 18 side has a narrow width. Projecting portions 30 project toward the cap rubber 18 at vicinities of both end portions in the transverse direction of the base rubber 20 (the direction of arrow B in FIG. 3) such that respective top portions 30A of the projecting portions 30 are exposed at the outer surface of the cap rubber 18 and extend in the longitudinal direction. The projecting portion 30 is provided at a position corresponding to a circumferential direction groove of a shoulder portion of the tire. The circumferential direction groove of the shoulder portion is usually formed at a position which is 10 to 40% of the tread width from the tread end. Providing projecting portions at positions corresponding to circumferential direction grooves of a center portion of the tire is also included within the scope of this invention. In this case, usually the circumferential direction grooves of the center portion are provided so as to almost equally divide the land portion defined between the circumferential direction grooves of the shoulder portions into at least two portions. A boundary surface 24 of the cap rubber 18 and the base rubber 20 of the unvulcanized tread material 10 is substantially plane-shaped except for the areas at which the projecting portions 30 are located. The unvulcanized tread material 10 having this type of structure may be formed into an elongated sheet shape by an extruder.

NR/SBR rubbers (e.g., NR/SBR=45/55), which excel in irregular wear resistance, are used in the cap rubber 18. NR rubbers (e.g., 100% NR), which have superior heat build-up resistance and crack growth resistance, are used in the base rubber 20.

Next, a method of manufacturing a tire, using the unvulcanized tread material of the present invention, will be described.

The process of manufacturing a pneumatic tire mainly comprises a step of forming the green tire and a vulcanizing step. The green tire is generally formed in the following manner. An inner liner rubber layer and a rubberized cord layer, which serves as a carcass ply, are successively superposed on a cylindrical drum. Bead rings are set on both sides of the drum. Thereafter, end portions of the carcass ply are folded over the bead rings. Next, an unvulcanized tread material for a pneumatic tire including two layer members of a cap layer and a base layer is disposed on the outer side of the carcass ply. A belt or a rubberized cord layer, which serves as a breaker, may or may not be interposed between the carcass ply and the unvulcanized tread material. The green tire, on which the tread material of the present invention is provided, is obtained in this way. Next, the green tire is placed in a mold and is vulcanized therein.

Figure 1:
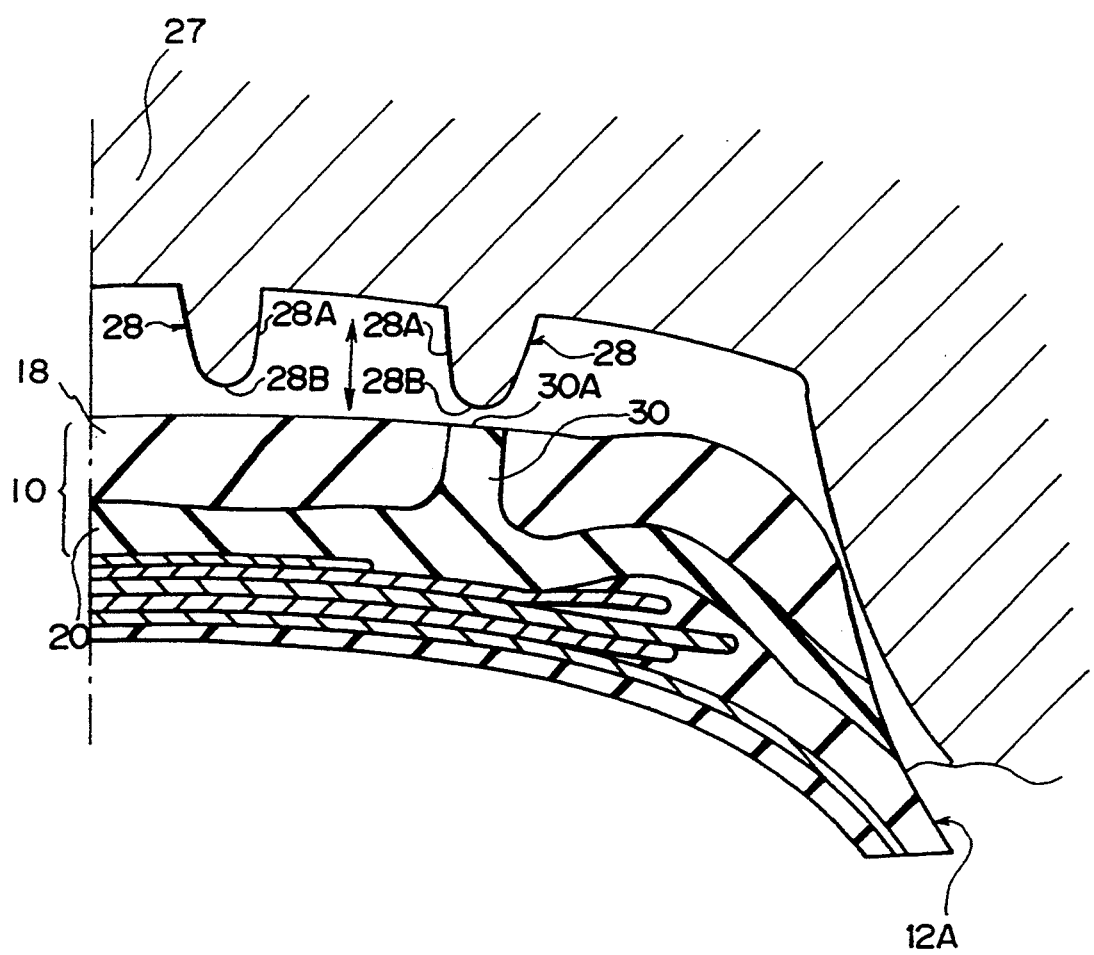
FIG. 1 is a partially sectional view of an embodiment of a green tire with the tread material of the present invention accommodated within a mold used for vulcanization.

FIG. 1 is a partially sectional view illustrating a green tire 12A which is accommodated within a mold for vulcanization and at an outer periphery of which the unvulcanized tread material 10 is disposed. A plurality of convex portions 28 for forming circumferential direction grooves is provided at a mold for vulcanization 27 such that the individual convex portions 28 for forming circumferential direction grooves are provided at predetermined intervals. The convex portion 28, for forming a circumferential direction groove which is at the shoulder portion, of the mold for vulcanization 27 is set at a position (e.g., a range of 10 to 40% of the tread width from the tread end) opposing the projecting portion 30 of the unvulcanized tread material 10 which is disposed on the outer periphery of the green tire 12A.

When the green tire 12A is set within the mold for vulcanization 27 and is forced from the inner side of the green tire 12A by an unillustrated bladder, the projecting portions 30 of the base rubber 20 contact the top portions 28B of the convex portions 28 for forming circumferential grooves. Next, the cap rubber 18 surrounds the side surfaces 28A of the convex portions 28 for forming circumferential grooves. Accordingly, in a manufactured pneumatic tire 12, shown in FIG. 2, which has been removed from the mold after vulcanization forming, the base rubber 20, which has superior crack growth resistance, is exposed at a bottom portion 22B of a vertical groove 22 of the shoulder portion. At the vertical groove 22 of the shoulder portion, the boundary surface 24 of the cap rubber 18 and the base rubber 20 appears between side surfaces 22A and the bottom surface 22B of the vertical groove 22. It is preferable that the height of the materialized boundary surface 24, from the bottom of the groove, be greater than or equal to 5% of the depth of the groove.

In this way, the bottom portion 22B of the vertical groove 22 of the shoulder portion is formed by the cap rubber 18 in which NR rubber, which has superior crack growth resistance, is used. Therefore, it is difficult for cracks to form from the bottom portion 22B, and rib tear defects, which are caused by cracks in the bottom portions of the vertical grooves, can be prevented.

Figure 2:
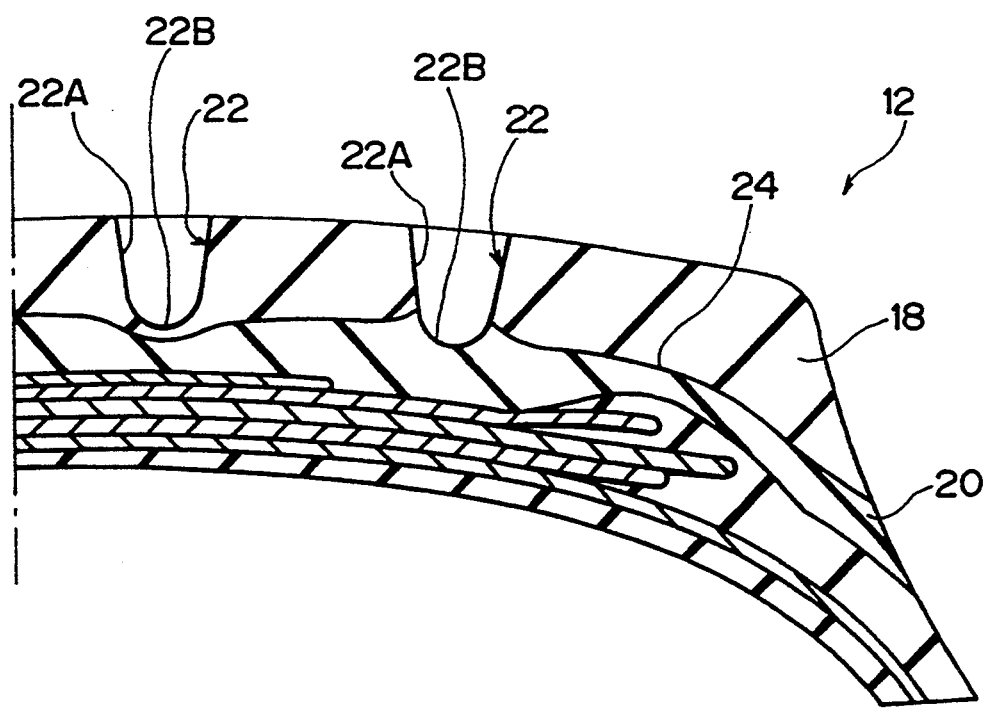
FIG. 2 is a partially sectional view of the embodiment of a manufactured tire of the present invention obtained by vulcanizing the green tire shown in FIG. 1.
Figure 4:
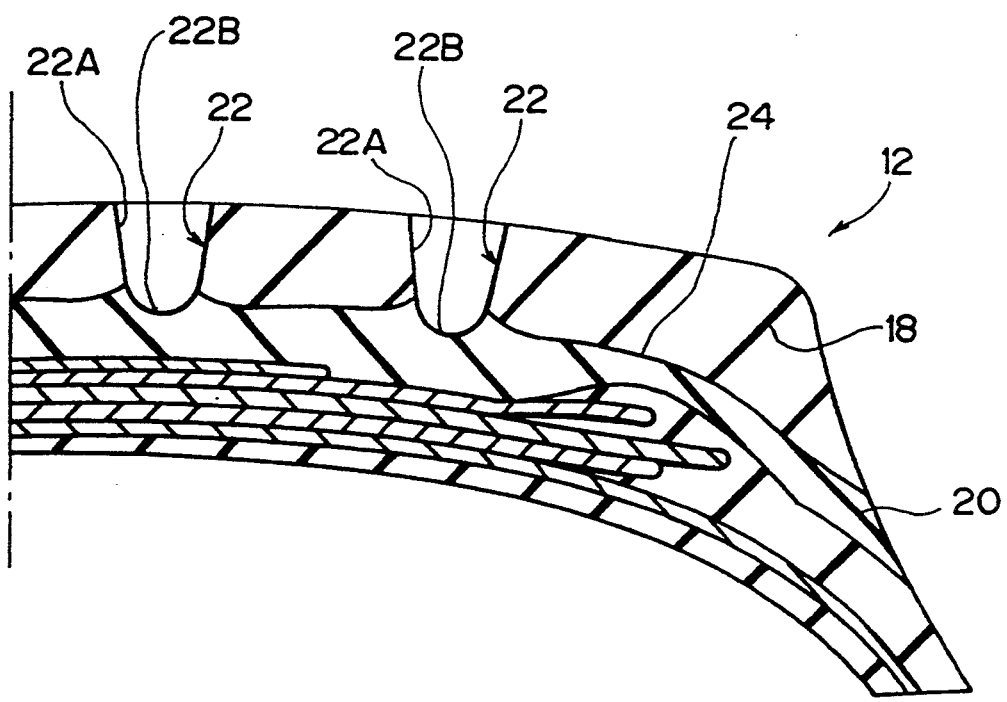
FIG. 4 is a partially sectional view of a manufactured tire obtained in accordance with an embodiment of a method of the present invention.

In the present embodiment illustrated in FIGS. 1 and 2, the projecting portion 30 of the base rubber 20 is provided so as to correspond to the vertical groove 22 of the shoulder portion. However, the present invention is not limited to the same. A structure may be provided in which the projecting portions 30 correspond to vertical grooves 22 other than that of the shoulder portion. For example, when the projecting portions 30 are provided so as to correspond to vertical grooves 22 of the center portion, as shown in FIG. 4, the base rubber 20 is exposed at the bottom portions 22B of the vertical grooves 22 of the center portion. In this case, the occurrence of cracks can be prevented at the vertical grooves 22 of the center portion, and the generation of rib tear defects from the vertical grooves 22 of not only the shoulder portion but also the center portion is prevented.

Figure 5:
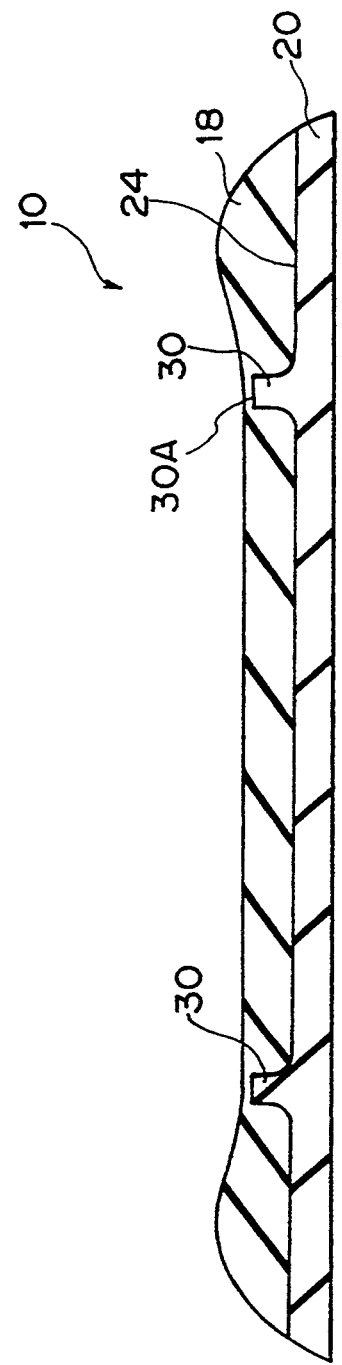
FIG. 5 is a sectional view in a longitudinal direction of another embodiment of an unvulcanized tread material of the present invention.
Figure 6:
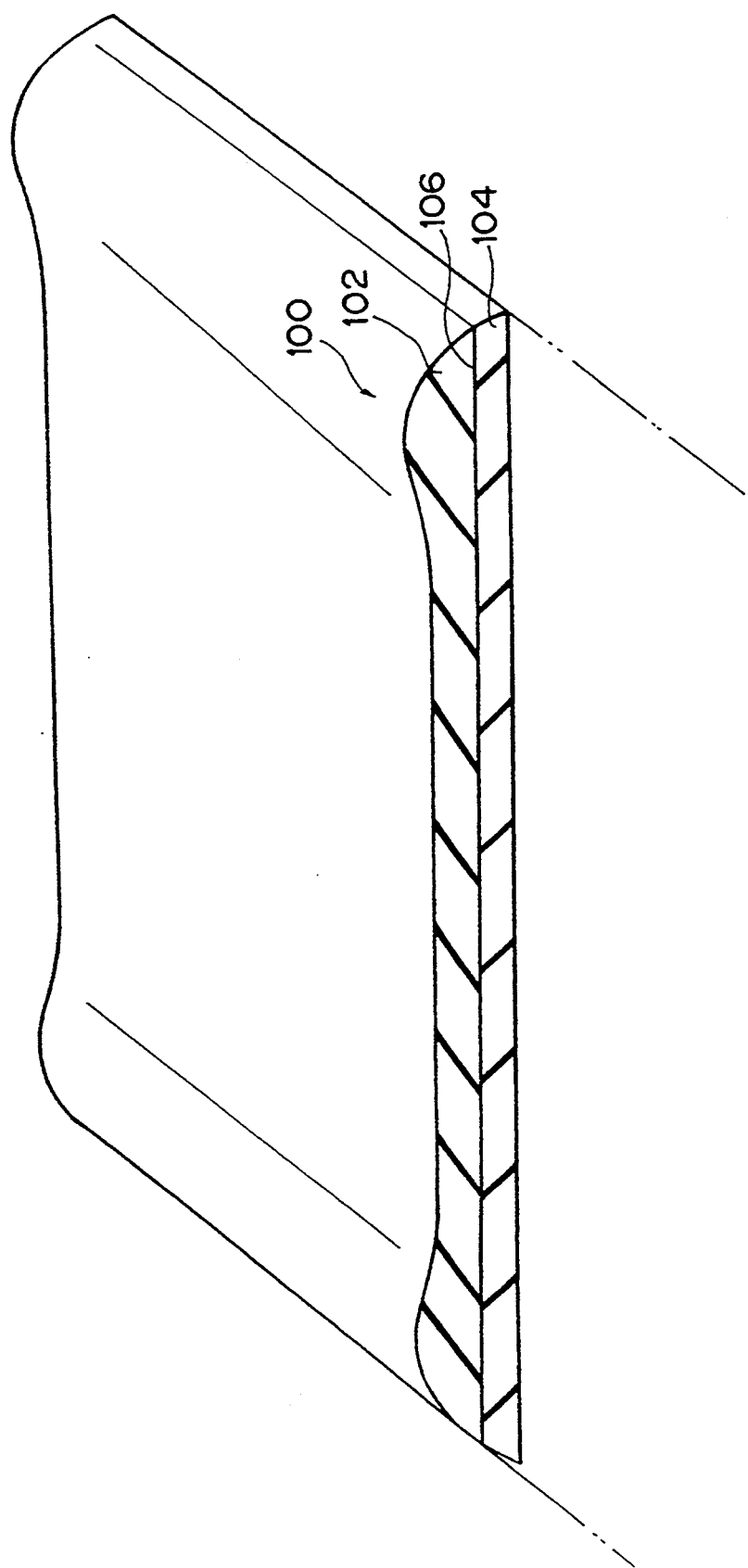
FIG. 6 is a perspective view of a conventional unvulcanized tread material for a pneumatic tire.

Another embodiment of the unvulcanized tread material of the present invention is illustrated in FIG. 5. In FIG. 5, the projecting portions 30 of the base rubber 20 project toward the cap rubber 18 side without being exposed at the surface of the cap rubber 18. In FIG. 5, the projected height is 8 mm, and it is preferable that the projected height be greater than or equal to 3 mm. If this height is less than 3 mm, when the green tire is accommodated in the mold and forced, the cap layer remains above the projecting portion without the convex portion for forming a circumferential direction groove contacting the projecting portion of the base layer.

When the projecting portion 30 of the base rubber 20 approaches the convex portion of the mold by the pressurizing of the green tire, a thin portion of the cap rubber 18 between the projecting portion 30 and the convex portion of the mold moves to both sides of the convex portion for forming a circumferential direction groove. Then, the top portion 30A of the projecting portion 30 and the top portion of the convex portion contact. Therefore, as shown in FIGS. 2 and 4, the base rubber 20 is exposed at the bottom portions 22B of the vertical grooves 22 of the manufactured pneumatic tire 12 after vulcanization forming. As a result of this structure, the occurrence of rib tear defects is prevented.

Further, in the present embodiment, the rubber used in the cap rubber 18 is mainly NR/SBR rubber, and the rubber used in the base rubber 20 is mainly NR rubber. However, the present invention is not limited to the same, and a combination of various types of rubber having certain characteristics can be used depending on the use of the tire.

EXPERIMENTAL EXAMPLE

Figure 7:
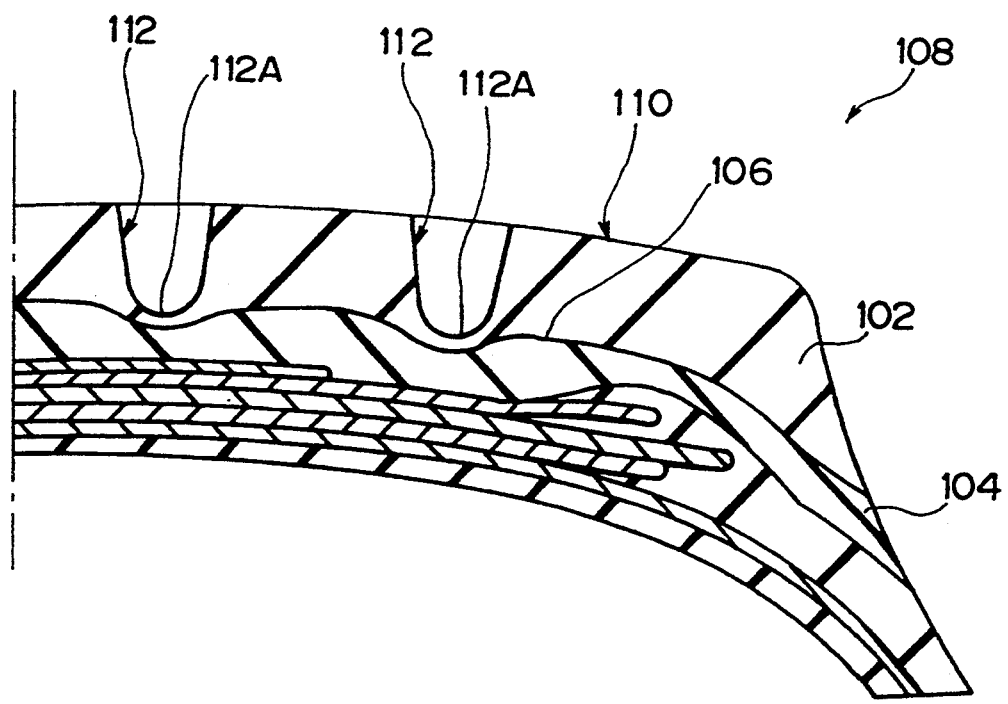
FIG. 7 is a sectional view illustrating a conventional example of a manufactured tire.

An experiment was performed in which a vehicle was driven over a curb using the pneumatic tire having the conventional structure illustrated in FIG. 7 and the pneumatic tire of the present invention illustrated in FIG. 2. The results of this experiment are given in Table 1.

In this experiment, the tire size was 295/75R22.5, and the length of the crack in the bottom portion of the vertical groove of the shoulder portion was measured after the vehicle was driven 50,000 Km. Further, the length of the crack is expressed as an index wherein the length of the crack of the pneumatic tire of the conventional structure is 100. Incidentally, the smaller number is more favorable.

TABLE 1

|  | Tire of the Present Invention | Conventional Tire |
| --- | --- | --- |
| Length of Crack in Vertical Groove of Shoulder Side (Index) | 62 | 100 |

From the above-listed results of the experiment, it is clear that the length of the crack of the pneumatic tire of the present invention is shorter than that of the conventional tire, and that in the present invention, rib tear resistance is improved compared with the conventional tire.

The present invention can be implemented in various forms without deviating from the spirit or essential characteristics thereof. The above-described embodiments are in all respects merely illustrative examples and cannot be interpreted restrictively. For example, the configuration and structure of the tread material of the present invention are not limited to the embodiments illustrated in FIGS. 3 and 5; a variety of configurations and structures exists within the scope of the claims.

What is claimed is:

1. An unvulcanized tread material for a pneumatic tire comprising two layer members of a cap layer and a base layer, said cap layer and said base layer being arranged such that at least one portion of said base layer member projects into said cap layer and is exposed at an outer surface of said cap layer.

2. An unvulcanized tread material for a pneumatic tire according to claim 1, wherein a height of a projection of said base layer member into said cap layer is at least 3 mm.

3. An unvulcanized tread material for a pneumatic tire comprising two layer members of a cap layer and a base layer, said cap layer and said base layer being arranged such that at least one portion of said base layer member projects into said cap layer and opposes a corresponding at least one circumferential direction groove to be formed in a manufactured tire.

4. An unvulcanized tread material for a pneumatic tire according to claim 3, wherein said at least one portion of said base layer member projects into said cap layer and is exposed at an outer surface of said cap layer.

5. An unvulcanized tread material for a pneumatic tire according to claim 3, wherein a height of a projection of said base layer member into said cap layer is at least to 3 mm.

6. An unvulcanized tread material for a pneumatic tire according to claim 3, wherein one of said at least circumferential direction grooves is a circumferential direction groove of a shoulder portion.

7. An unvulcanized tread material for a pneumatic tire according to claim 4, wherein one of said at least one circumferential direction grooves is a circumferential direction groove of a shoulder portion.

8. An unvulcanized tread material for a pneumatic tire according to claim 3, wherein said cap layer is formed of NR/SBR rubber, and said base layer is formed of NR rubber.

* * * * *